June 4, 1946.   F. E. ALTMAN   2,401,324
WIDE ANGLE TELESCOPE OBJECTIVE
Filed Nov. 20, 1943
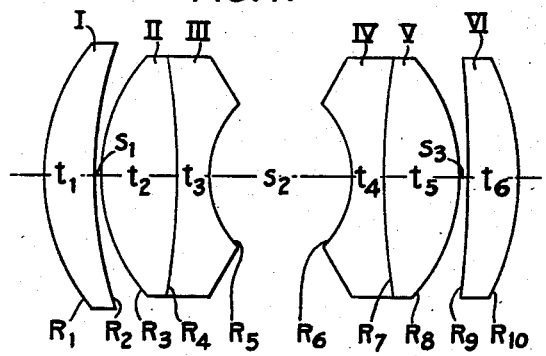
FIG. 1.
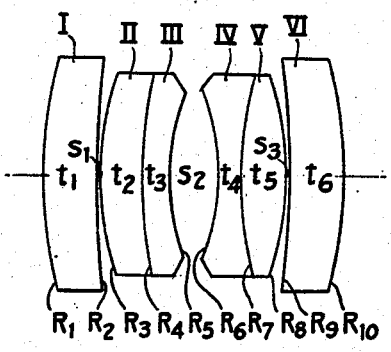
FIG. 3.
FIG. 2.
| EF = 100 mm | | | PETZVAL SUM = −.0109 | |
|---|---|---|---|---|
| LENS | $N_D$ | V | RADII | SPACINGS |
| I | 1.745 | 46.4 | $R_1 = +26.4$ | $t_1 = 6.1$ |
|  |  |  | $R_2 = +47.9$ | $S_1 = 0.7$ |
| II | 1.611 | 57.2 | $R_3 = +21.6$ | $t_2 = 9.1$ |
| III | 1.617 | 36.6 | $R_4 = -86.1$ | $t_3 = 4.0$ |
|  |  |  | $R_5 = +12.5$ | $S_2 = 17.6$ |
| IV | 1.617 | 36.6 | $R_6 = -12.5$ | $t_4 = 4.0$ |
| V | 1.611 | 57.2 | $R_7 = +86.1$ | $t_5 = 9.1$ |
|  |  |  | $R_8 = -21.6$ | $S_3 = 0.7$ |
| VI | 1.745 | 46.4 | $R_9 = -106.2$ | $t_6 = 6.1$ |
|  |  |  | $R_{10} = -36.1$ | BF = 72. |
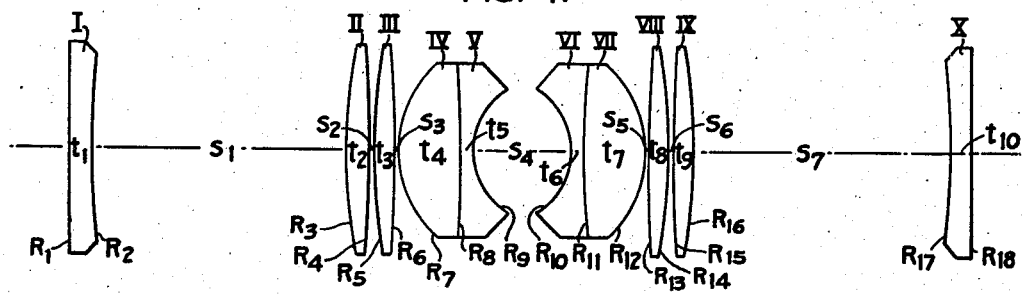
FIG. 4.
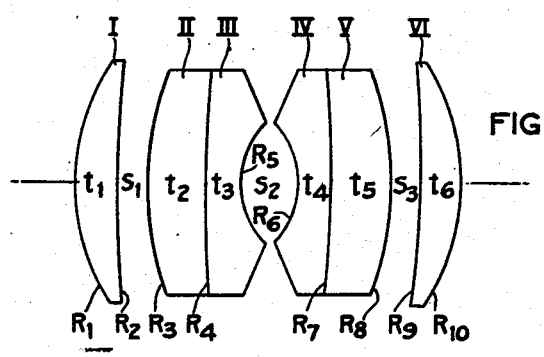
FIG. 5.
FRED E. ALTMAN
INVENTOR
BY Newton M. Perkins
F. M. Emerson Holmes
ATTY & AGT Patented June 4, 1946

2,401,324

UNITED STATES PATENT OFFICE 2,401,324

WIDE-ANGLE TELESCOPE OBJECTIVE

Fred E. Altman, Rochester, N. Y., assignor to Eastman Kodak Company, Rochester, N. Y., a corporation of New Jersey Application November 20, 1943, Serial No. 511,059

13 Claims. (Cl. 88—57)

This invention relates to telescope objectives.

The object of the invention is to provide an objective lens for a telescope or other sighting device by which the astigmatism and curvature of field of the system is corrected and a sharp image maintained at the center of the field of view.

A particular object of the invention is to provide an objective with a negative Petzval sum and with a backward curving field suitable for use in a sighting device according to my copending application Serial No. 511,062 filed concurrently herewith.

For convenience in description the term "objective" as used in the present patent application includes both the types of lenses described in the copending case which are designated there as "objectives" and "erectors," an erector or relay lens merely being an objective which works at finite conjugates.

It is recognized that a sighting system must have a small Petzval sum if it is to have a flat anastigmatic field image. The present invention is the first to provide an objective which makes a considerable negative Petzval contribution tending to balance the positive contribution of the rest of the sighting system, particularly the eyepiece and field lenses. At the same time the objective can be corrected for zonal spherical aberration so as to give critically sharp definition on the axis, an achievement not previously thought possible without resorting to aspheric surfaces.

The present invention applies particularly to that type of objective consisting of two collective members separated by a central airspace, each member comprising a thick meniscus component strongly concave toward the central airspace and at least one positive component on the convex side of the meniscus component. By "thick" is meant thicker than about 0.08 F, where F is the focal length of the objective, and in the specific preferred embodiments described below in which the Petzval sum is negative this thickness is at least 0.13 F. By "strongly concave" is meant with a radius of curvature less than F.

This type of objective is well known and widely used in photography, both at finite conjugates and for distant objects. In its most common form the thick meniscus components are negative doublets comprising a positive and a negative element, and there are two positive components, one in front and one in the rear, each of which is a single positive element with its outer surface the more strongly curved.

The invention is equally applicable to variations from this form, such as those which include a greater number of, or more complex, components or have small airspaces in the thick meniscus components, or which have one or more compound positive components combined with simple or compound meniscus components, or combinations of these features.

According to the invention the surfaces bounding the central airspace in an objective of the type described have radii of curvature less than F/3 where F is the focal length of the objective, and the positive elements, particularly the outer positive elements, have unusually high indices of refraction. In general as the refractive indices are higher, the concave inner surfaces may be weaker while still effectively embodying the invention, since the high index of the positive elements aids in correcting the positive Petzval sum. These reflective indices may be as high as obtainable. At the present time published types of glass go nearly to 2.1 in refractive index.

According to one embodiment of the invention, the average refractive index of all the positive elements is greater than 1.6 and at least one of the surfaces bounding the central airspace has a radius of curvature less than 0.21 F. Preferably both inner surfaces have this short radius.

According to another form of the invention, the radii of curvature of the surfaces bounding the central airspace are shorter on the average than the length of the central airspace, and preferably both of these radii are shorter than the length of this airspace. The refractive index of the glass at these surfaces also has an important effect. Accordingly this form of the invention may be described in a slightly different way by stating that the average value of $R/(N-1)$ exceeds the length of the central airspace by less than $F/6$, where R is the radius of curvature of either surface bounding the central airspace and N is the refractive index of the glass on the other side of that surface.

A similar embodiment is best described by a relationship between these innermost radii of curvature and the index of the outer components since both contribute to Petzval correction as described above. According to the relationship, both the outer positive elements have refractive indices greater than 1.60, and the average radius of curvature of the inner negative surfaces is less than (0.25 $N_{OP}$−0.16) F where $N_{OP}$ is the average refractive index of the two outer positive elements with respect to the D line of the spectrum. For example, if the two outer positive elements have refractive indices just over 1.60, the average radius of curvature of the inner negative surfaces would be 0.24 F or smaller according to this embodiment, while a limiting average radius of 0.265 F would correspond to $N_{OP}$=1.70. Thus, less strongly curved inner surfaces embody the invention effectively when the index of the outer positive elements is higher, as described above.

In the most preferred embodiment of the invention at least one positive element in each of the two members which make up the objective has a refractive index greater than 1.66 and a dispersive index greater than 35, and the radii of curvature of the two inner concave surfaces are less than 0.21 F.

If the objective is to be used at about equal conjugates, it is preferred that it be symmetrical with respect to the central airspace.

Lenses according to the invention are also useful as photographic lenses, especially when very sharp definition is desired over a somewhat smaller angular field than usual.

In the accompanying drawing:

Figs. 1, 3, 4, and 5 show objectives according to the invention.

Fig. 2 gives data for a preferred embodiment of the invention, corresponding to Fig. 1.

Data for several examples of objectives according to the invention are given in the conventional manner in the following tables. Example 2 corresponds to Fig. 2 in the drawing. The refractive index N is given for the D line of the spectrum, and the focal length in each case is 100 millimeters.

*Example 1, Fig. 1*

| Lens | N | V | Radii | Spacings |
|---|---|---|---|---|
| I & VI | 1.617 | 55.0 | $+R_1=-R_{10}$=42.1 mm. | $t_1=t_4$=8.3 mm. |
|  |  |  | $+R_2=-R_9$=292 | $s_1=s_3$=0.9 |
| II & V | 1.617 | 55.0 | $+R_3=-R_8$=36.2 | $t_2=t_5$=13.6 |
| III & IV | 1.605 | 38.0 | $-R_4=+R_7$=114 | $t_3=t_4$=7.2 |
|  |  |  | $+R_5=-R_6$=19.9 | $s_2$=23.6 |

*Example 2, Figs. 1 and 2*

| Lens | N | V | Radii | Spacings |
|---|---|---|---|---|
| I | 1.745 | 46.4 | $+R_1$=26.4 mm. | $t_1$=6.1 mm. |
|  |  |  | $+R_2$=47.9 | $s_1$=0.7 |
| II | 1.611 | 57.2 | $+R_3$=21.6 | $t_2$=9.1 |
| III | 1.617 | 36.6 | $-R_4$=86.1 | $t_3$=4.0 |
|  |  |  | $+R_5$=12.5 | $s_2$=17.6 |
| IV | 1.617 | 36.6 | $-R_6$=12.5 | $t_4$=4.0 |
| V | 1.611 | 57.2 | $+R_7$=86.1 | $t_5$=9.1 |
|  |  |  | $-R_8$=21.6 | $s_3$=0.7 |
| VI | 1.745 | 46.4 | $-R_9$=106.2 | $t_6$=6.1 |
|  |  |  | $-R_{10}$=36.1 | BF=72 |

*Example 3, Fig. 3*

| Lens | N | V | Radii | Spacings |
|---|---|---|---|---|
| I | 1.744 | 45.8 | $R_1$=+56.0 mm. | $t_1$=6.9 mm. |
|  |  |  | $R_2$=+267 | $s_1$=0.2 |
| II | 1.617 | 55.0 | $R_3$=+40.8 | $t_2$=4.9 |
| III | 1.617 | 36.6 | $R_4$=+58.3 | $t_3$=3.3 |
|  |  |  | $R_5$=+25.8 | $s_2$=5.9 |
| IV | 1.617 | 36.6 | $R_6$=−24.2 | $t_4$=3.3 |
| V | 1.617 | 55.0 | $R_7$=+72.5 | $t_5$=4.9 |
|  |  |  | $R_8$=−40.0 | $s_3$=0.2 |
| VI | 1.744 | 45.8 | $R_9$=−114 | $t_6$=6.9 |
|  |  |  | $R_{10}$=−39.0 | BF=89 |

*Example 4, Fig. 4*

| Lens | N | V | Radii | Spacings |
|---|---|---|---|---|
| I & X | 1.517 | 64.5 | $R_1=R_{18}=-\infty$ | $t_1=t_{10}$=8.0 mm. |
|  |  |  | $+R_2=-R_{17}$=256 mm. | $s_1=s_7$=95.0 |
| II & IX | 1.755 | 47.2 | $+R_3=-R_{16}$=204 | $t_2=t_9$=8.0 |
|  |  |  | $-R_4=+R_{15}$=809 | $s_2=s_6$=1.3 |
| III & VIII | 1.755 | 47.2 | $+R_5=-R_{14}$=204 | $t_3=t_8$=8.0 |
|  |  |  | $-R_6=+R_{13}$=809 | $s_3=s_5$=1.3 |
| IV & VII | 1.697 | 56.1 | $+R_7=-R_{12}$=44.1 | $t_4=t_7$=22.7 |
| V & VI | 1.673 | 32.2 | $-R_8=+R_{11}$=385 | $t_5=t_6$=5.3 |
|  |  |  | $+R_9=-R_{10}$=27.3 | $s_4$=36.6 |

*Example 5, Fig. 5*

| Lens | N | V | Radii | Spacings |
|---|---|---|---|---|
| I & VI | 1.697 | 56.1 | $+R_1=-R_{10}$=43.2 mm. | $t_1=t_6$=7.4 mm. |
|  |  |  | $+R_2=-R_9$=230 | $s_1=s_3$=5.4 |
| II & V | 1.697 | 56.1 | $+R_3=-R_8$=28.6 | $t_2=t_5$=10.8 |
| III & IV | 1.673 | 32.2 | $+R_4=-R_7$=216 | $t_3=t_4$=6.1 |
|  |  |  | $+R_5=-R_6$=15.1 | $s_2$=11.6 |

*Example 6, Fig. 5*

| Lens | N | V | Radii | Spacings |
|---|---|---|---|---|
| I & VI | 1.697 | 56.1 | $+R_1=-R_{10}$=32.3 mm. | $t_1=t_6$=6.2 mm. |
|  |  |  | $+R_2=-R_9$=83.4 | $s_1=s_3$=4.6 |
| II & V | 1.697 | 56.1 | $+R_3=-R_8$=20.4 | $t_2=t_5$=9.1 |
| III & IV | 1.673 | 32.2 | $+R_4=-R_7$=81.8 | $t_3=t_4$=5.1 |
|  |  |  | $+R_5=-R_6$=10.6 | $s_2$=10.9 |

In all the examples the inner negative surfaces have radii of curvature less than ⅓ F and the average index of the positive elements is greater than 1.6 in accordance with the invention. Examples 1, 2, 5, and 6 have the preferred feature of both the inner surfaces having radii of curvature smaller than 0.21 F.

Other preferred features are shown in the following table as embodied in some or all of the examples.

| Example No. | $N_{OP}$ | (25$N_{OP}$−16)>$R_{IN}$ | Ptz. sum | $\frac{R_{IN}}{N-1}$−s |
|---|---|---|---|---|
| 1 | 1.617 | 24.4>19.9 | −.0008 | 9.3 |
| 2 | 1.745 | 27.8>12.5 | −.0109 | 2.7 |
| 3 | 1.744 | 27.8>25.0 | +.0014 |  |
| 4 | 1.755 | 27.9>27.3 | −.0016 | 4.0 |
| 5 | 1.697 | 26.4>15.1 | −.0042 | 10.9 |
| 6 | 1.697 | 26.4>10.6 | −.0088 | 4.9 |

In this table $N_{OP}$ is the average refractive index of the two outermost positive elements and $R_{IN}$ is the average radius of the two inner dispersive surfaces.

Example 4, Fig. 4, shows a variation from the most common form of this type of objective in that there are two positive components in each of the two members. The splitting of the usual positive component into two serves to correct the zonal spherical aberration for a larger relative aperture. The negative components close to the conjugate planes were added merely for changing the apparent stop position so as to meet the conditions of use.

In Example 6 the inner surfaces have radii only .106 F. This seemed, upon trying the lens, to be smaller than the optimum, and thus it appeared that 0.1 F would be about as short as would be useful.

What I claim is:

1. An objective consisting of two collective members separated by a central airspace, each member comprising a thick meniscus compound component strongly concave toward the central airspace and at least one positive component on the convex side of the meniscus component, characterized by the average refractive index of the positive elements being between 1.6 and 2.1, by the radius of curvature of each of the concave surfaces bounding the central airspace being between $\frac{1}{10}$ F and $\frac{1}{3}$ F where F is the focal length of the objective, by the Petzval sum being negative, and by at least one of said concave surfaces having a radius of curvature less than 0.21 F.

2. An objective according to claim 1 which is symmetrical with respect to the central airspace.

3. An objective consisting of two collective members separated by a central airspace, each member comprising a thick meniscus compound component strongly concave toward the central airspace and at least one positive component on the convex side of the meniscus component, characterized by the average refractive index of the positive elements being between 1.6 and 2.1, by the radius of curvature of each of the concave surfaces bounding the central airspace being between $\frac{1}{10}$ F and $\frac{1}{3}$ F where F is the focal length of the objective, by the thickness of each meniscus component being greater than 0.13 F, by the refractive index of both of the outermost positive elements being greater than 1.60, and by the average radius of curvature of the two said inner concave surfaces being less than $(0.25 N_{OP} - 0.16)$ F where $N_{OP}$ is the average refractive index of the two outer positive elements with respect to the D line of the spectrum.

4. An objective according to claim 3 which has a negative Petzval sum.

5. An objective consisting of two collective members separated by a central airspace, each member comprising a thick meniscus compound component strongly concave toward the central airspace and at least one positive component on the convex side of the meniscus component, characterized by at least one positive element in each member having a refractive index greater than 1.66 and a dispersive index greater than 35 while the average refractive index of all the positive elements is greater than 1.60, and further characterized by each of the two surfaces bounding the central airspace having a radius of curvature less than 0.21 F where F is the focal length of the objective, and by the thickness of each meniscus component being greater than 0.13 F.

6. An objective according to claim 5 which has a negative Petzval sum.

7. An objective consisting of two collective members separated by a central airspace, each member comprising a thick meniscus compound component strongly concave toward the central airspace and at least one positive component on the convex side of the meniscus component, characterized by the average refractive index of the positive elements being between 1.6 and 2.1, by the radii of curvature of the concave surfaces bounding the central airspace being on the average longer than 0.1 F and shorter than the length of the central airspace, where F is the focal length of the objective.

8. An objective according to claim 7 in which said central airspace is longer than either of said radii of curvature.

9. An objective consisting of two collective members separated by a central airspace, each member comprising a thick meniscus compound component strongly concave toward the central airspace and at least one positive component on the convex side of the meniscus component, characterized by the average value of the ratio $$R/(N-1)$$

for the two surfaces bounding the central airspace exceeds the axial length of the central airspace by less than F/6, where R is the radius of curvature and N the refractive index of the glass at the surface and F is the focal length of the objective.

10. An objective consisting of two collective members separated by a central airspace each member consisting of a thick meniscus compound component strongly concave toward the central airspace and at least one positive component on the convex side of the meniscus component characterized by the average refractive index of the positive elements of the objective being between 1.6 and 2.1, by the refractive index of each of the outermost positive elements being greater than 1.60, by the Petzval sum for the objective being negative, by the average value of the ratio $R/(N-1)$ for the two surfaces bounding the central airspace exceeding the axial length of the central airspace by less than F/6, where R is the radius of curvature and N is the refractive index of the glass at the surface and F is the focal length of the objective, each of said two radii of curvature being between $\frac{1}{10}$ F and $\frac{1}{3}$ F and the average value of said two radii being less than $(0.25 N_{OP} - 0.16)$ F where $N_{OP}$ is the average refractive index of the two outer positive elements with respect to the D line of the spectrum.

11. An objective according to claim 10 in which at least one of said radii of curvature of surfaces bounding the central airspace is less than 0.21 F.

12. An objective according to claim 10 in which each of said radii of curvature of the surfaces bounding the central airspace is less than 0.21 F.

13. An objective according to claim 10 in which the thickness of each meniscus component is greater than 0.13 F.

FRED E. ALTMAN.